United States Patent
Richardson et al.

(10) Patent No.: US 11,685,234 B2
(45) Date of Patent: Jun. 27, 2023

(54) SYSTEM AND METHOD FOR RECOVERING REFRIGERANT FROM A HEAT EXCHANGER OF A THERMAL SYSTEM FOR AN ELECTRIC VEHICLE

(71) Applicant: GM GLOBAL TECHNOLOGY OPERATIONS LLC, Detroit, MI (US)

(72) Inventors: Devin C. Richardson, Novi, MI (US); Cameron Paul Smith, Milford, MI (US); Anthony James Donatelli, Waterford, MI (US); Nathan John English, Auburn Hills, MI (US); Tanay Kalpej Patel, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 55 days.

(21) Appl. No.: 17/375,890

(22) Filed: Jul. 14, 2021

(65) Prior Publication Data
US 2023/0016257 A1    Jan. 19, 2023

(51) Int. Cl.
*B60H 1/32* (2006.01)
*B60H 1/00* (2006.01)

(52) U.S. Cl.
CPC ....... *B60H 1/3205* (2013.01); *B60H 1/00392* (2013.01); *B60H 1/00485* (2013.01); *B60H 1/3227* (2013.01); *B60H 2001/326* (2013.01); *B60H 2001/3266* (2013.01); *B60H 2001/3272* (2013.01); *B60H 2001/3279* (2013.01); *B60H 2001/3285* (2013.01)

(58) Field of Classification Search
CPC .............. B60H 1/3205; B60H 1/00392; B60H 1/00485; B60H 1/3227; B60H 2001/326; B60H 2001/3266; B60H 2001/3272; B60H 2001/3286; F25B 45/00; F25B 2345/002; F25B 2345/003; F25B 2600/19; F25B 2700/21163
See application file for complete search history.

(56) References Cited

U.S. PATENT DOCUMENTS

| | | | | |
|---|---|---|---|---|
| 5,095,713 | A * | 3/1992 | Laukhuf ................ | F25B 45/00 62/149 |
| 6,125,643 | A * | 10/2000 | Noda ................ | B60H 1/00914 62/196.4 |
| 2003/0159449 | A1* | 8/2003 | Takano .................. | F25B 45/00 62/174 |
| 2020/0309394 | A1* | 10/2020 | Blanton ................. | F16K 11/00 |

OTHER PUBLICATIONS

U.S. Appl. No. 17/305,753, filed Jul. 14, 2021, Richardson et al.

* cited by examiner

*Primary Examiner* — Marc E Norman (57) ABSTRACT

A control system includes a refrigerant recovery module and at least one of a valve control module and a compressor control module. The refrigerant recovery module is configured to generate a refrigerant recovery signal to initiate a recovery of refrigerant from a first heat exchanger of a thermal system for an electric vehicle, and to stop the refrigerant recovery based on a temperature of refrigerant circulating through the first heat exchanger. The valve control module is configured to open a first valve to allow refrigerant to flow through the first heat exchanger in response to the refrigerant recovery signal. The compressor control module is configured to increase a speed of a compressor disposed upstream from the first heat exchanger in response to the refrigerant recovery signal.

20 Claims, 4 Drawing Sheets

SYSTEM AND METHOD FOR RECOVERING REFRIGERANT FROM A HEAT EXCHANGER OF A THERMAL SYSTEM FOR AN ELECTRIC VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for recovering refrigerant from a heat exchanger of a thermal system for an electric vehicle.

A thermal system for a vehicle is operable to heat or cool air circulating through a passenger cabin of the vehicle and to heat or cool coolant circulating through a propulsion system of the vehicle. A vehicle thermal system typically includes a compressor, a condenser, an expansion valve, an evaporator, and chiller. The compressor circulates refrigerant through the thermal system. The condenser transfers heat from the refrigerant to ambient air. The expansion valve decreases the pressure of the refrigerant. The evaporator transfers heat from the cabin air to the refrigerant. The chiller transfers heat from the coolant to the refrigerant.

In a thermal system for an electric vehicle, the compressor is typically an electric compressor. The propulsion system for an electric vehicle typically includes an electric motor and a battery pack, which may not generate enough heat to maintain the cabin air at a target temperature. Thus, in some cases, the thermal system for an electric vehicle includes an electric coolant heater that supplements the amount of heat transferred to the coolant by the propulsion system.

SUMMARY

An example of a control system according to the present disclosure includes a refrigerant recovery module and at least one of a valve control module and a compressor control module. The refrigerant recovery module is configured to generate a refrigerant recovery signal to initiate a recovery of refrigerant from a first heat exchanger of a thermal system for an electric vehicle, and to stop the refrigerant recovery based on a temperature of refrigerant circulating through the first heat exchanger. The valve control module is configured to open a first valve to allow refrigerant to flow through the first heat exchanger in response to the refrigerant recovery signal. The compressor control module is configured to increase a speed of a compressor disposed upstream from the first heat exchanger in response to the refrigerant recovery signal.

In one aspect, the refrigerant recovery module is configured to stop the refrigerant recovery based on at least one of (i) a magnitude of the refrigerant temperature and (ii) an amount of change in the refrigerant temperature during the refrigerant recovery.

In one aspect, the refrigerant recovery module is configured to stop the refrigerant recovery when the refrigerant temperature is less than a first temperature.

In one aspect, the refrigerant recovery module is configured to stop the refrigerant recovery when the refrigerant temperature increases by a first amount from the refrigerant temperature when the refrigerant recovery is initiated.

In one aspect, the refrigerant recovery module is configured to stop the refrigerant recovery when the refrigerant temperature decreases by a first amount from a maximum value of the refrigerant temperature during the refrigerant recovery.

In one aspect, the refrigerant recovery module is configured to stop the refrigerant recovery when a period of the refrigerant recovery is greater than a first period.

In one aspect, the refrigerant recovery module is configured to not generate the refrigerant recovery signal when a propulsion system of the electric vehicle requires cooling.

In one aspect, the refrigerant recovery module is configured to not generate the refrigerant recovery signal when the first valve is open.

In one aspect, the refrigerant recovery module is configured to not generate the refrigerant recovery signal when a speed of the electric vehicle is greater than a first speed.

In one aspect, the refrigerant recovery module is configured to not generate the refrigerant recovery signal when a period that has elapsed since the electric vehicle was switched off is less than a first period.

In one aspect, the control system includes both the valve control module and the compressor control module.

In one aspect, the control system includes the valve control module, the first heat exchanger is an external condenser, and the first valve is an external condenser flow valve disposed directly upstream of the external condenser.

In one aspect, in response to the refrigerant recovery signal, the valve control module is further configured to close a heating condenser flow valve, open a chiller expansion valve, activate a coolant heater, and close an evaporator expansion valve.

An example of an electric vehicle thermal system according to the present disclosure includes a first heat exchanger, a first valve, a compressor, a refrigerant recovery module, and at least one of a valve control module and a compressor control module. The first valve is operable to regulate refrigerant flow through the first heat exchanger. The compressor is operable to circulate refrigerant through the first heat exchanger. The refrigerant recovery module is configured to generate a refrigerant recovery signal to initiate a recovery of refrigerant from the first heat exchanger, and to stop the refrigerant recovery based on a temperature of refrigerant circulating through the first heat exchanger. The valve control module is configured to open the first valve to allow refrigerant to flow through the first heat exchanger in response to the refrigerant recovery signal. The compressor control module is configured to increase a speed of the compressor in response to the refrigerant recovery signal.

In one aspect, the thermal system includes both the valve control module and the compressor control module.

In one aspect, the first heat exchanger is an external condenser, and the first valve is an external condenser flow valve disposed directly upstream of the external condenser.

In one aspect, the thermal system further includes a heating condenser, a heating condenser flow valve, a chiller, a chiller expansion valve, a coolant heater operable, an evaporator, and an evaporator expansion valve. The heating condenser flow valve is disposed directly upstream of the heating condenser. The chiller expansion valve is operable to regulate refrigerant flow through the chiller. The coolant heater is operable to heat coolant circulating through the chiller. The evaporator expansion valve is disposed directly upstream of the evaporator.

In one aspect, the external condenser is disposed in parallel with the heating condenser, the chiller is disposed in parallel with the evaporator, the evaporator and the chiller are disposed downstream of the external condenser and the heating condenser, and the compressor is disposed downstream of the evaporator and the chiller and upstream of the external condenser and the heating condenser.

In one aspect, in response to the refrigerant recovery signal, the valve control module is further configured to close the heating condenser flow valve, open the chiller expansion valve, activate the coolant heater, and close the evaporator expansion valve.

An example of a method according to the present disclosure includes generating a refrigerant recovery signal to initiate a recovery of refrigerant from a first heat exchanger of a thermal system for an electric vehicle, stopping the refrigerant recovery based on a temperature of refrigerant circulating through the first heat exchanger, and at least one of (i) opening a first valve to allow refrigerant to flow through the first heat exchanger in response to the refrigerant recovery signal and (ii) increasing a speed of a compressor disposed upstream from the first heat exchanger in response to the refrigerant recovery signal.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

In some cases, a thermal system for an electric vehicle includes an external condenser disposed outside of a passenger cabin of the electric vehicle and a heating condenser disposed within the passenger cabin. The external condenser transfers heat from refrigerant to ambient air. The heating condenser transfers heat from refrigerant to cabin air. To cool the cabin air, a control system controls the thermal system to allow refrigerant to flow through the external condenser and the evaporator and prevent refrigerant flow through the heating condenser and the chiller. To heat the cabin air, the control system controls the thermal system to allow refrigerant to flow through the heating condenser and the chiller and prevent refrigerant flow through the external condenser and the evaporator.

When the control system transitions the thermal system from cooling the cabin air to heating the cabin air, a significant amount of refrigerant may be trapped in the external condenser as the external condenser closes. In turn, an undercharge situation may exist where there is not enough refrigerant in the active flow path of the thermal system. This may be particularly so during periods when the demand on the thermal system is high. Due to the undercharge situation, the thermal system may not be able to increase the temperature of the cabin air to the target temperature and/or satisfy other thermal demands on the thermal system, which may lead to hardware damage.

To avoid this issue, a control system according to the present disclosure initiates a recovery of refrigerant trapped in the external condenser when an undercharge situation is detected. During the refrigerant recovery, the control system controls the thermal system to allow refrigerant to flow through the external condenser and the chiller and prevent refrigerant flow through the heating condenser and the evaporator. In addition, the control system increases the speed of the electric compressor to a target speed to purge refrigerant from the external condenser to the active flow path. Furthermore, the control system activates the electric coolant heater to heat the coolant and thereby heat the refrigerant as it flows through the chiller. Heating the refrigerant increases the pressure of the refrigerant and thereby increases the amount of refrigerant purged from the external condenser.

The control system determines when to stop the refrigerant recovery based on the temperature of the refrigerant temperature and/or the period of the refrigerant recovery. The refrigerant temperature may be measured at or near an outlet of the external condenser. In one example, the control system stops the refrigerant recovery when the refrigerant temperature, or the refrigerant subcool, is less than a predetermined temperature. The refrigerant subcool is equal to the refrigerant temperature minus a saturation temperature of the refrigerant at a given pressure. The magnitude of the predetermined temperature may vary depending on whether the refrigerant temperature or the refrigerant subcool is used as the criteria for determining when to stop the refrigerant recovery. In another example, the control system stops the refrigerant recovery when the period of the refrigerant recovery is greater than or equal to a predetermined period.

The present disclosure describes in detail a control system for recovering refrigerant from the external condenser. In various implementations, the control system may recover refrigerant from one or more other heat exchangers of the thermal system in a similar manner. For example, the control system may recover refrigerant from the heating condenser, the evaporator, and/or the chiller using the techniques described herein in connection with recovering refrigerant from the external condenser.

Figure 1:
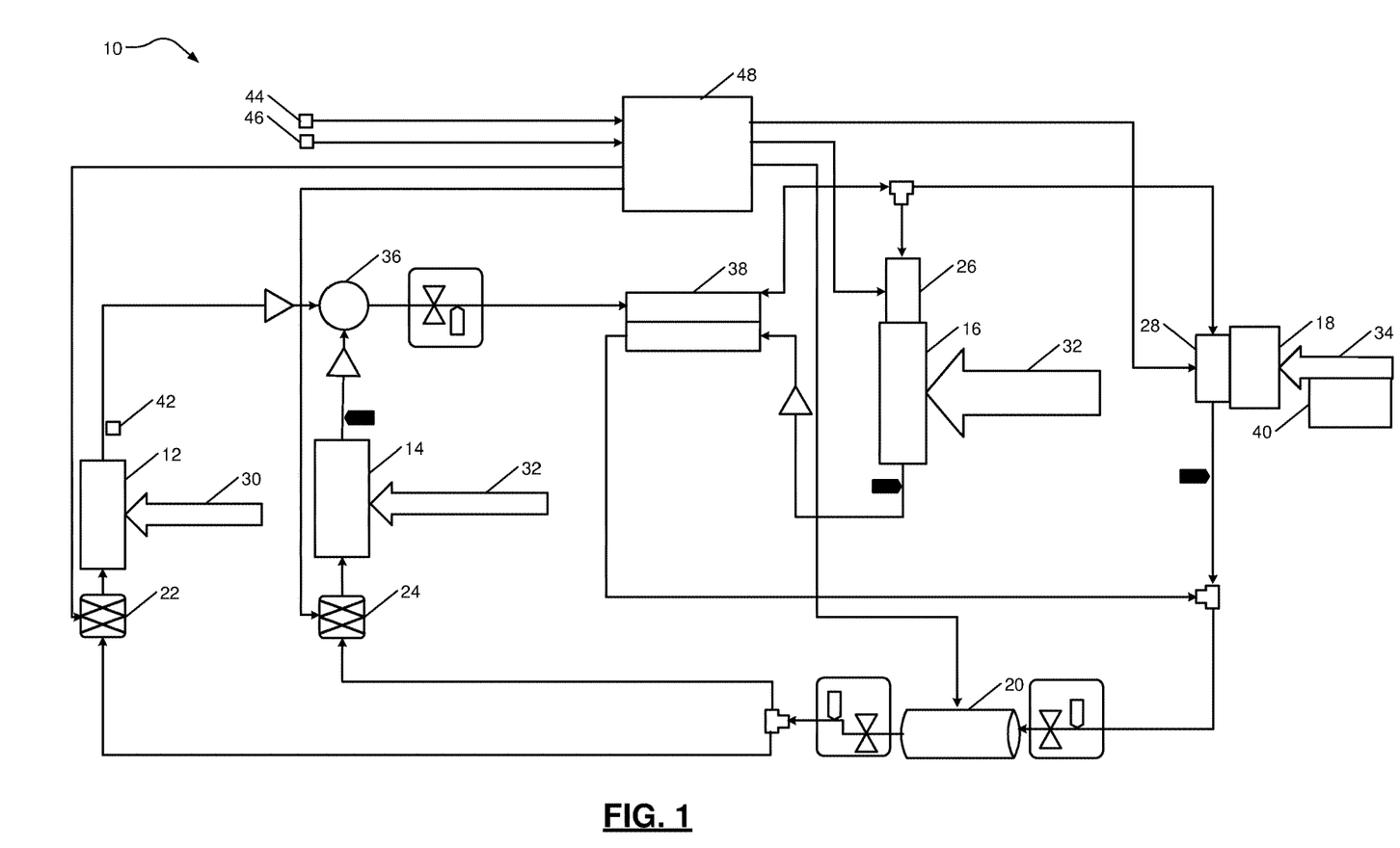
FIG. 1 is an example of an electric vehicle thermal system according to the present disclosure.

Referring now to FIG. 1, a thermal system 10 for an electric vehicle is operable to heat or cool air circulating through a passenger cabin (not shown) of the electric vehicle. In addition, the thermal system 10 is operable to heat or cool coolant circulating through a propulsion system (not shown) of the electric vehicle. The propulsion system includes one or more electric motors and one or more battery packs that supply power to the electric motors. In one example, the thermal system 10 absorbs heat from the cabin or ambient air into the refrigerant to heat the passenger cabin, and expels heat from the refrigerant to ambient air. In another example, the thermal system 10 absorbs heat from the coolant into the refrigerant, and expels heat from the refrigerant to the cabin air to heat the passenger cabin.

The thermal system 10 includes an external condenser 12, a heating condenser 14, an evaporator 16, a chiller 18, an electric compressor 20, an external condenser flow valve 22, a heating condenser flow valve 24, an evaporator expansion valve 26, and a chiller expansion valve 28. The external condenser 12 is disposed in parallel with the heating condenser 14. The evaporator 16 is disposed in parallel with the chiller 18. The evaporator 16 and the chiller 18 are disposed downstream of the external condenser 12 and the heating condenser 14. The electric compressor 20 is disposed downstream of the evaporator 16 and the chiller 18 and upstream of the external condenser 12 and the heating condenser 14.

The external condenser 12 releases heat from the refrigerant flowing therethrough to ambient air 30 flowing therethrough. The external condenser 12 is disposed outside of the passenger cabin of the electric vehicle, such as near the front end of the electric vehicle. The external condenser flow valve 22 regulates the flow rate of refrigerant circulating through the external condenser 12. The external condenser flow valve 22 is disposed directly upstream of the external condenser 12.

The heating condenser 14 releases heat from the refrigerant flowing therethrough to cabin air 32 flowing therethrough. The heating condenser 14 is disposed within the passenger cabin of the electric vehicle. The heating condenser flow valve 24 regulates the flow rate of refrigerant circulating through the heating condenser 14. The heating condenser flow valve 24 is disposed directly upstream of the heating condenser 14.

The evaporator 16 absorbs heat from the cabin air 32 flowing therethrough into refrigerant flowing therethrough. The evaporator expansion valve 26 reduces the pressure of refrigerant flowing therethrough, which decreases the temperature of the refrigerant entering the evaporator 16. In addition, the evaporator expansion valve 26 may be closed to prevent the flow of refrigerant to the evaporator 16. The evaporator expansion valve 26 is disposed directly upstream of the evaporator 16.

The chiller 18 absorbs heat from coolant 34 flowing therethrough into refrigerant flowing therethrough. The chiller expansion valve 28 reduces the pressure of refrigerant flowing therethrough, which decreases the temperature of the refrigerant entering the chiller 18. In addition, the chiller expansion valve 28 may be closed to prevent the flow of refrigerant to the chiller 18. The chiller expansion valve 28 is disposed directly upstream of the chiller 18.

The electric compressor 20 circulates refrigerant through the thermal system 10, including the external condenser 12, the heating condenser 14, the evaporator 16, and the chiller 18, when the electric compressor 20 is turned on or activated. The speed of the electric compressor 20 may be adjustable to adjust the flow rate of refrigerant circulating through the thermal system 10. The electric compressor 20 is disposed downstream of the evaporator 16 and the chiller 18 and upstream of the external condenser 12 and the heating condenser 14.

In the example shown in FIG. 1, the thermal system 10 further includes a refrigerant drier bottle 36, an intermediate heat exchanger 38, an electric coolant heater 40, a refrigerant temperature sensor 42, a vehicle speed sensor 44, a starter switch sensor 46, and a thermal system control module 48. The refrigerant drier bottle 36 stores refrigerant and releases the stored refrigerant into the thermal system 10 during periods of heavy operation (e.g., when the thermal system 10 is transferring heat from one medium to another medium at a high rate). The intermediate heat exchanger 38 transfers heat between refrigerant flowing out of the evaporator 16 and refrigerant flowing into the evaporator 16.

The electric coolant heater 40 uses electricity to heat the coolant 34 flowing through the electric coolant heater 40. The electric coolant heater 40 heats the coolant 34 when the electric coolant heater 40 is turned on or activated. The electric coolant heater 40 may be activated when the amount of heat transferred from the propulsion system of the electric vehicle to the coolant 34 is insufficient to heat the cabin air to a target temperature.

The refrigerant temperature sensor 42 measures the temperature of refrigerant circulating through the external condenser 12 and generates a signal indicating the refrigerant temperature. In the example shown, the refrigerant temperature sensor 42 is disposed directly downstream from the external condenser 12 and measures the temperature of refrigerant flowing out of the external condenser 12. In various implementations, the refrigerant temperature sensor 42 may be disposed in or upstream of the external condenser 12.

The vehicle speed sensor 44 measures the speed of the electric vehicle and generates a signal indicating the vehicle speed. The starter switch sensor 46 monitors the position of a starter switch (not shown) of the electric vehicle and generates a signal indicating the starter switch position. Adjusting the starter switch to an ON position switches on the electrical vehicle (e.g., activates its electrical system (not shown)). Adjusting the starter switch to an OFF position switches off the electric vehicle (e.g., deactivates its electrical system).

The thermal system control module 48 controls various actuators of the thermal system 10 based on inputs from sensors. When the temperature of the cabin air 32 is less than a target temperature (e.g., a temperature set by a user of the electric vehicle), the thermal system control module 48 adjusts the actuators to transfer heat from the coolant 34 to the cabin air 32. For example, the thermal system control module 48 opens the heating condenser flow valve 24 and the chiller expansion valve 28 to allow refrigerant to flow through the heating condenser 14 and the chiller 18. In addition, the thermal system control module 48 closes the external condenser flow valve 22 and the evaporator expansion valve 26 to prevent refrigerant flow through the external condenser 12 and the evaporator 16.

When the temperature of the cabin air 32 is greater than the target temperature, the thermal system control module 48 adjusts the actuators to transfer heat from the cabin air 32 to the ambient air 30 via the refrigerant circulating through the thermal system 10. For example, the thermal system control module 48 opens the external condenser flow valve 22 and the evaporator expansion valve 26 to allow refrigerant to flow through the external condenser 12 and the evaporator 16. In addition, the thermal system control module 48 closes the heating condenser flow valve 24 and the chiller expansion valve 28 to prevent refrigerant flow through the heating condenser 14 and the chiller 18.

When the thermal system control module 48 transitions the thermal system 10 from cooling the cabin air 32 to heating the cabin air 32, a significant amount of refrigerant may be trapped in the external condenser 12 as the external condenser flow valve 22 closes. In turn, an undercharge situation may exist where there is not enough refrigerant in the active flow path of the thermal system 10. This may be particularly so during periods when the demand on the thermal system 10 is high. Due to the undercharge situation, the thermal system 10 may not be able to increase the temperature of the cabin air 32 to the target temperature.

To avoid this issue, the thermal system control module 48 initiates a recovery of refrigerant in trapped in the external condenser 12 when an undercharge situation is detected. During the refrigerant recovery, the thermal system control module 48 opens the external condenser flow valve 22 and the chiller expansion valve 28 to allow refrigerant to flow through the external condenser 12 and the chiller 18. In addition, the thermal system control module 48 closes the heating condenser flow valve 24 and the evaporator expansion valve 26 to prevent refrigerant flow through the heating condenser 14 and the evaporator 16. Furthermore, the thermal system control module 48 increases the speed of the electric compressor 20 to a target speed to purge refrigerant from the external condenser to the active flow path. Moreover, the thermal system control module 48 activates the electric coolant heater 40 to heat the coolant 34 and thereby heat the refrigerant as it flows through the chiller 18. Heating the refrigerant increases the pressure of the refrigerant and thereby increases the amount of refrigerant purged from the external condenser 12.

The thermal system control module 48 determines when to stop the refrigerant recovery based on the refrigerant temperature from the refrigerant temperature sensor 42 and/or the period of the refrigerant recovery. In one example, the thermal system control module 48 stops the refrigerant recovery when the refrigerant temperature, or the refrigerant subcool, is less than the predetermined temperature. In another example, the thermal system control module 48 stops the refrigerant recovery when the period of the refrigerant recovery is greater than or equal to a timeout period.

Figure 2:
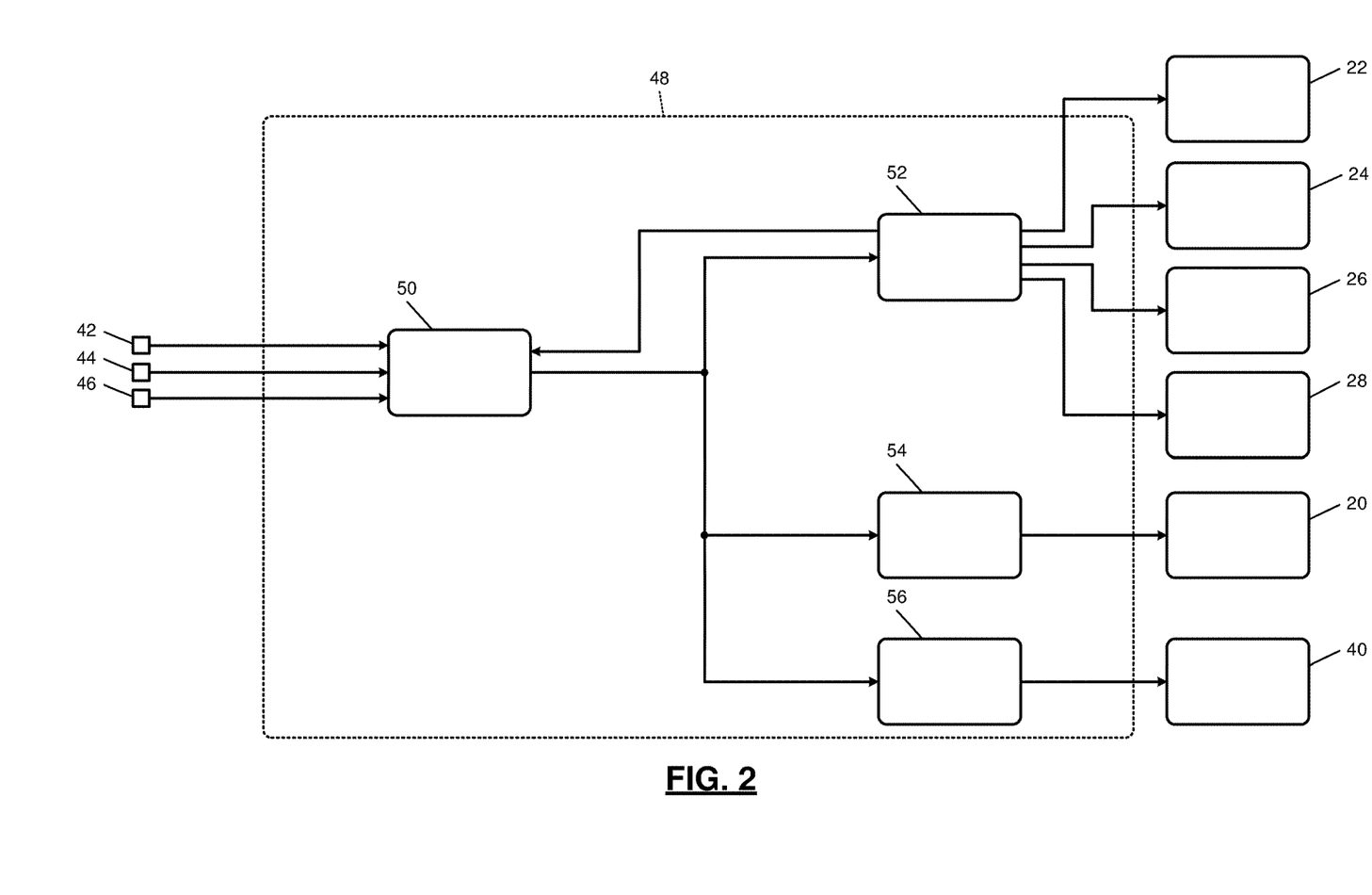
FIG. 2 is an example control system according to the present disclosure.

Referring now to FIG. 2, an example implementation of the thermal system control module 48 includes a refrigerant recovery module 50, a valve control module 52, a compressor control module 54, and a heater control module 56. The refrigerant recovery module 50 generates a refrigerant recovery signal to initiate the recovery of refrigerant from the external condenser 12 when an undercharge situation is detected in the thermal system 10 and one or more conditions is/are satisfied. The refrigerant recovery module 50 determines whether the condition(s) is/are satisfied based on one or more of the vehicle speed from the vehicle speed sensor 44, the starter switch position from the starter switch position sensor 6, and the position of the external condenser flow valve 22.

The refrigerant recovery module 50 determines when to stop generating the refrigerant recovery signal based on the refrigerant temperature from the refrigerant temperature sensor 42 and/or the period of the refrigerant recovery. In one example, the refrigerant recovery module 50 stops the refrigerant recovery when the refrigerant subcool is less than a predetermined temperature. In another example, the refrigerant recovery module 50 stops the refrigerant recovery when the period of the refrigerant recovery is greater than or equal to a predetermined period.

The valve control module 52 generates valve control signals to control the positions of the external condenser flow valve 22, the heating condenser flow valve 24, the evaporator expansion valve 26, and the chiller expansion valve 28. In response to the refrigerant recovery signal, the valve control module 52 opens the external condenser flow valve 22 and the chiller expansion valve 28 and closes the heating condenser flow valve 24 and the evaporator expansion valve 26. When the refrigerant recovery module 50 stops generating the refrigerant recovery signal, the valve control module 52 closes the external condenser flow valve 22. In addition, the refrigerant recovery module 50 adjusts the positions of the heating condenser flow valve 24, the evaporator expansion valve 26, and the chiller expansion valve 28 based on the thermal demand(s) on the thermal system 10.

The compressor control module 54 generates a compressor control signal to control the speed of the electric compressor 20. In response to the refrigerant recovery signal, the compressor control module 54 increases the speed of the electric compressor 20 to a target speed, which may be predetermined. When the refrigerant recovery module 50 stops generating the refrigerant recovery signal, the compressor control module 54 adjusts the speed of the electric compressor 20 based on the thermal demand on the thermal system 10.

The heater control module 56 generates a heater control signal to control the amount of heat generated by the electric coolant heater 40. In response to the refrigerant recovery signal, the heater control module 56 activates (i.e., turns on) the electric coolant heater 40. When the refrigerant recovery module 50 stops generating the refrigerant recovery signal, the heater control module 56 may deactivate (i.e., turn off) the electric coolant heater 40. Additionally or alternatively, the refrigerant recovery module 50 determines whether to activate or deactivate the electric coolant heater 40 based on the thermal demand on the thermal system 10.

Figure 3:
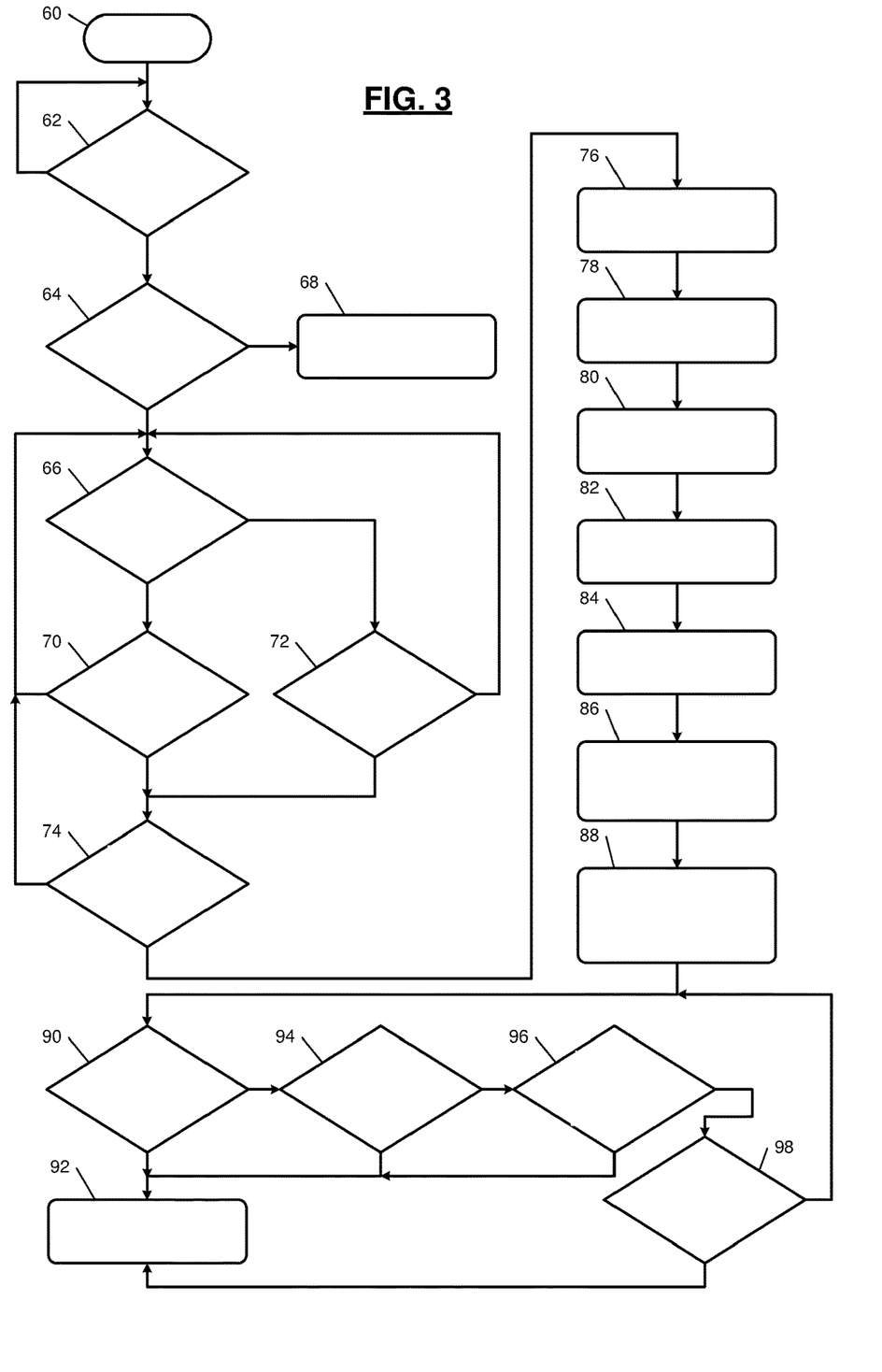
FIG. 3 is a flowchart illustrating an example control method according to the present disclosure.

Referring now to FIG. 3, a method for recovering refrigerant from the external condenser 12 begins at 60. At 62, the refrigerant recovery module 50 determines whether an undercharge situation in the thermal system 10 is detected. In one example, the refrigerant recovery module 50 detects an undercharge situation when a measured temperature of the cabin air 32 is less than the target temperature for at least a predetermined period.

At 64, the refrigerant recovery module 50 determines whether the external condenser flow valve 22 is closed. If the external condenser flow valve 22 is closed, the method continues at 66. Otherwise, the method continues at 68. At 68, the refrigerant recovery module 50 activates a service indicator (e.g., an electronic display, a speaker). In turn, the service indicator generates a visual message (e.g., text) and/or an audio message indicating that the thermal system 10 needs serviced (e.g., charged with refrigerant).

At 66, the refrigerant recovery module 50 determines whether the undercharge situation is severe. In one example, the refrigerant recovery module 50 determines that the undercharge situation is severe when a difference between the measured temperature of the cabin air 32 and the target temperature is greater than a predetermined amount. If the undercharge situation is severe, the method continues at 70. Otherwise, the method continues at 72.

At 70, the refrigerant recovery module 50 determines whether the vehicle speed is less than a speed threshold (e.g., a predetermined speed). If the vehicle speed is less than the speed threshold, the method continues at 74. Otherwise, the method returns to 66.

At 72, the refrigerant recovery module 50 determines whether the electric vehicle has been off (e.g., whether the starter switch of the electric vehicle has been in the off position) for at least a predetermined period. If the electric vehicle has been off for at least a predetermined period, the method continues at 74. Otherwise, the method returns to 66.

At 74, the refrigerant recovery module 50 determines whether the proportion system of the electric vehicle does not require cooling. If the proportion system does not require cooling, the method continues at 76. Otherwise, the method returns to 66.

At 76, the valve control module 52 opens the external condenser flow valve 22. At 78, the compressor control module 54 increases the speed of the electric compressor 20 to the target speed. At 80, the valve control module 52 closes the heating condenser flow valve 24. At 82, the valve control module 52 opens the chiller expansion valve 28.

At 84, the heater control module 56 activates the electric coolant heater 40. At 86, the valve control module 52 closes the evaporator expansion valve 26. At 88, the refrigerant recovery module 50 starts a timer and monitors the refrigerant temperature from the refrigerant temperature sensor 42.

At 90, the module 50 determines whether the refrigerant temperature (or the refrigerant subcool) has decreased to at least a minimum temperature, which may be predetermined. If the refrigerant temperature (or the refrigerant subcool) has decreased to at least the minimum temperature, the method continues at 92. Otherwise, the method continues at 94. The magnitude of the minimum temperature may vary depending on whether the refrigerant temperature or the refrigerant subcool is used as the criteria at 90.

At 94, the refrigerant recovery module 50 determines whether the refrigerant temperature (or the refrigerant subcool) has increased by at least a maximum amount, which may be predetermined. If the refrigerant temperature (or the refrigerant subcool) has increased by at least the maximum amount, the method continues at 92. Otherwise, the method continues at 96. The magnitude of the maximum amount may vary depending on whether the refrigerant temperature or the refrigerant subcool is used as the criteria at 94.

At 96, the refrigerant recovery module 50 determines whether the refrigerant temperature (or the refrigerant subcool) has decreased by at least a threshold amount from a local maximum during the refrigerant recovery. The threshold amount may be predetermined. If the refrigerant temperature (or the refrigerant subcool) has decreased by at least the threshold amount, the method continues at 92. Otherwise, the method continues at 98.

At 98, the refrigerant recovery module 50 determines whether the timer is greater than or equal to a threshold period, which may be predetermined. If the timer is greater than or equal to the threshold period, the method continues at 92. Otherwise, the method returns to 90.

At 92, the refrigerant recovery module 50 determines that the refrigerant recovery is complete. In turn, the refrigerant recovery module 50 stops generating the refrigerant recovery signal. Then, the method ends.

Figure 4:
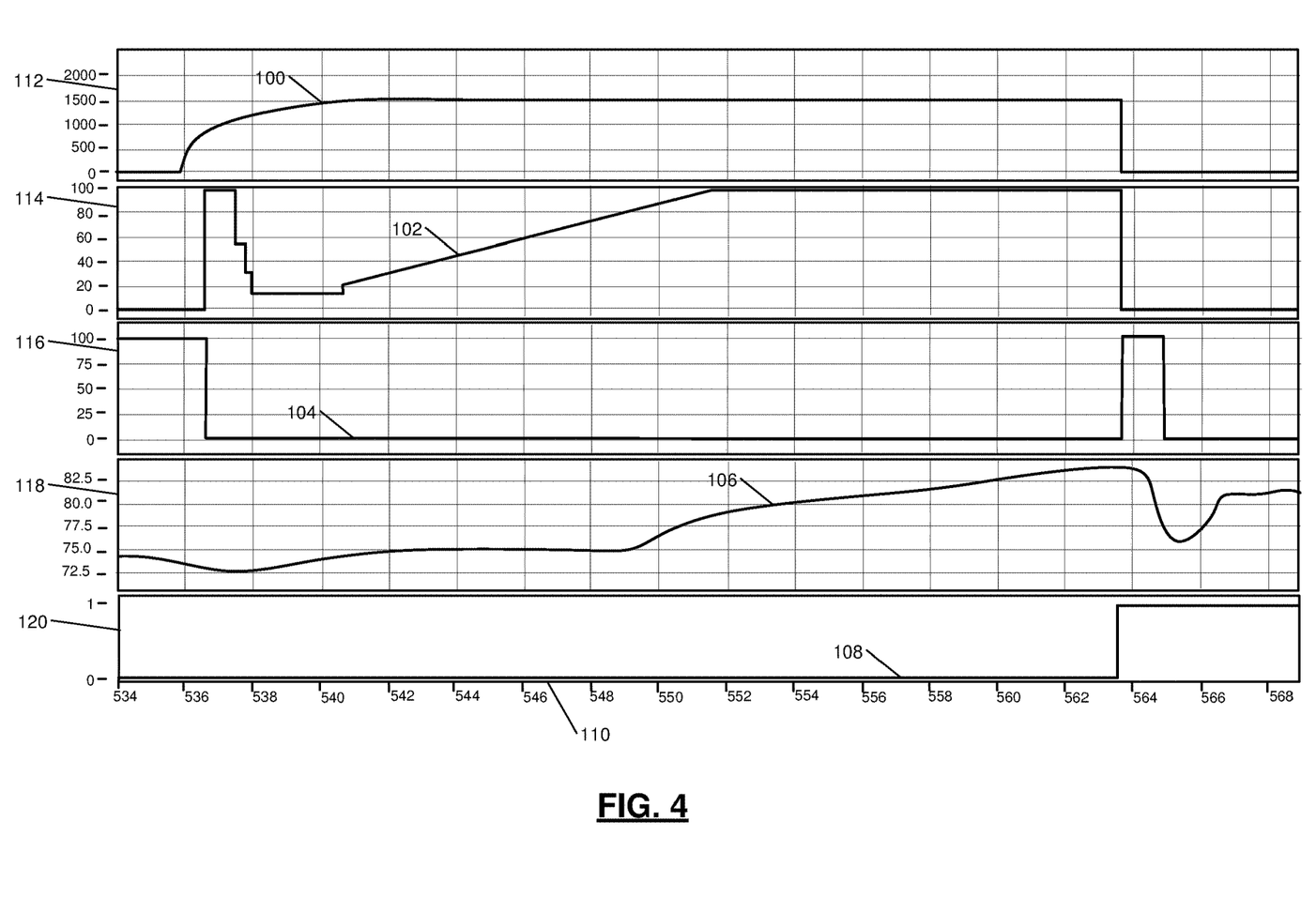
FIG. 4 is a graph illustrating example control signals and example sensor signals according to the present disclosure.

FIG. 4 shows examples of signals generated during a recovery of refrigerant from the external condenser 12. The signals shown in FIG. 4 include a compressor speed signal 100, an external condenser valve signal 102, a heating condenser valve signal 104, an external condenser temperature signal 106, and a purge completion signal 108. The compressor speed signal 100 is plotted with respect to an x-axis 110 that represents time in seconds and a y-axis 112 that represents compressor speed in revolutions per minute (RPM). The external condenser valve signal 102 is plotted with respect to the x-axis 110 and a y-axis 114 that represents the percentage by which the external condenser flow valve 22 is open, where zero percent corresponds to fully closed and 100 percent corresponds to fully open.

The heating condenser valve signal 104 is plotted with respect to the x-axis 110 and a y-axis 116 that represents the percentage by which the heating condenser flow valve 24 is open. The external condenser temperature signal 106 is plotted with respect to the x-axis 110 and a y-axis 118 represents the subcool of refrigerant downstream of the external condenser 12 in degrees Celsius (° C.). The purge completion signal 108 is plotted with respect to the x-axis 110 and a y-axis 120 that represents signal magnitude, with a magnitude of zero indicating that a purge is not yet complete and a magnitude of one indicating that the purge is complete.

Before a time of 536 seconds, the refrigerant recovery module 50 generates the refrigerant recovery signal to initiate a recovery of refrigerant from the external condenser 12. In turn, just before the time of 536 seconds, the compressor control module 54 starts to increase the speed of the compressor 20 as indicated by the compressor speed signal 100 to purge refrigerant from the external condenser 12. After the time of 536 seconds, the valve control module 52 opens the external condenser flow valve 22 and closes the heating condenser flow valve 24 as indicated by the external condenser valve signal 102 and heating condenser valve signal 104, respectively. Closing the heating condenser flow valve 24 removes all bypass routes around the external condenser 12.

During a period from a time of about 537 seconds to a time just before 564 seconds, the temperature of refrigerant at the outlet of the external condenser 12 increases as indicated by the external condenser temperature signal 106. During this period, the temperature of refrigerant at the outlet of the external condenser 12 increase by an amount 122 of 11° C., which indicates that the purge is complete.

When the purge is complete, the refrigerant recovery module 50 stops generating the refrigerant recovery signal adjusts the magnitude of the purge completion signal 108 from zero to one. In addition, the compressor control module 54 decreases the speed of the compressor 20 to zero as indicated by the compressor speed signal 100. Furthermore, the valve control module 52 closes the external condenser flow valve 22 and opens the heating condenser flow valve 24 as indicated by the external condenser valve signal 102 and heating condenser valve signal 104, respectively. Depending on the operating conditions when the purge is complete, the compressor control module 54 may not decrease the speed of the compressor 20 to zero, and the valve control module 52 may not open the heating condenser flow valve 24.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A control system comprising:
 a refrigerant recovery module configured to:
  generate a refrigerant recovery signal to initiate a recovery of refrigerant from a first heat exchanger of a thermal system for an electric vehicle; and
  stop the refrigerant recovery based on a temperature of refrigerant circulating through the first heat exchanger; and
 a valve control module configured to open a first valve to allow refrigerant to flow through the first heat exchanger in response to the refrigerant recovery signal.

2. The control system of claim 1 wherein the refrigerant recovery module is configured to stop the refrigerant recovery based on at least one of:
 a magnitude of the refrigerant temperature; and
 an amount of change in the refrigerant temperature during the refrigerant recovery.

3. The control system of claim 2 wherein the refrigerant recovery module is configured to stop the refrigerant recovery when the refrigerant temperature is less than a first temperature.

4. The control system of claim 2 wherein the refrigerant recovery module is configured to stop the refrigerant recovery when the refrigerant temperature increases by a first amount from the refrigerant temperature when the refrigerant recovery is initiated.

5. The control system of claim 2 wherein the refrigerant recovery module is configured to stop the refrigerant recovery when the refrigerant temperature decreases by a first amount from a maximum value of the refrigerant temperature during the refrigerant recovery.

6. The control system of claim 1 wherein the refrigerant recovery module is configured to stop the refrigerant recovery when a period of the refrigerant recovery is greater than a first period.

7. The control system of claim 1 wherein the refrigerant recovery module is configured to not generate the refrigerant recovery signal when a propulsion system of the electric vehicle requires cooling.

8. The control system of claim 1 wherein the refrigerant recovery module is configured to not generate the refrigerant recovery signal when the first valve is open.

9. The control system of claim 1 wherein the refrigerant recovery module is configured to not generate the refrigerant recovery signal when a speed of the electric vehicle is greater than a first speed.

10. The control system of claim 1 wherein the refrigerant recovery module is configured to not generate the refrigerant recovery signal when a period that has elapsed since the electric vehicle was switched off is less than a first period.

11. The control system of claim 1 further comprising a compressor control module configured to increase a speed of a compressor disposed upstream from the first heat exchanger in response to the refrigerant recovery signal.

12. The control system of claim 1 wherein:
the control system comprises the valve control module;
the first heat exchanger is an external condenser; and
the first valve is an external condenser flow valve disposed directly upstream of the external condenser.

13. The control system of claim 12 wherein, in response to the refrigerant recovery signal, the valve control module is further configured to:
close a heating condenser flow valve;
open a chiller expansion valve;
activate a coolant heater; and
close an evaporator expansion valve.

14. A thermal system for an electric vehicle, the thermal system comprising:
a first heat exchanger;
a first valve operable to regulate refrigerant flow through the first heat exchanger;
a compressor operable to circulate refrigerant through the first heat exchanger;
a refrigerant recovery module configured to:
generate a refrigerant recovery signal to initiate a recovery of refrigerant from the first heat exchanger; and
stop the refrigerant recovery based on a temperature of refrigerant circulating through the first heat exchanger; and
a valve control module configured to open the first valve to allow refrigerant to flow through the first heat exchanger in response to the refrigerant recovery signal.

15. The thermal system of claim 14 further comprising a compressor control module configured to increase a speed of the compressor in response to the refrigerant recovery signal.

16. The thermal system of claim 15 wherein:
the first heat exchanger is an external condenser; and
the first valve is an external condenser flow valve disposed directly upstream of the external condenser.

17. The thermal system of claim 16 further comprising:
a heating condenser;
a heating condenser flow valve disposed directly upstream of the heating condenser;
a chiller;
a chiller expansion valve operable to regulate refrigerant flow through the chiller;
a coolant heater operable to heat coolant circulating through the chiller;
an evaporator; and
an evaporator expansion valve disposed directly upstream of the evaporator.

18. The thermal system of claim 17 wherein:
the external condenser is disposed in parallel with the heating condenser;
the chiller is disposed in parallel with the evaporator;
the evaporator and the chiller are disposed downstream of the external condenser and the heating condenser; and
the compressor is disposed downstream of the evaporator and the chiller and upstream of the external condenser and the heating condenser.

19. The thermal system of claim 17 wherein, in response to the refrigerant recovery signal, the valve control module is further configured to:
close the heating condenser flow valve;
open the chiller expansion valve;
activate the coolant heater; and
close the evaporator expansion valve.

20. A method comprising:
generating a refrigerant recovery signal to initiate a recovery of refrigerant from a first heat exchanger of a thermal system for an electric vehicle;
stopping the refrigerant recovery based on a temperature of refrigerant circulating through the first heat exchanger; and
opening a first valve to allow refrigerant to flow through the first heat exchanger in response to the refrigerant recovery signal.

* * * * *